US012626311B2

(12) United States Patent
Cha

(10) Patent No.: US 12,626,311 B2
(45) Date of Patent: May 12, 2026

(54) SYSTEM AND METHOD FOR MOBILE CHARGING SERVICE FOR ELECTRIC VEHICLE

(71) Applicants:Hyundai Motor Company, Seoul (KR); Kia Corporation, Seoul (KR)

(72) Inventor: Sung Ryul Cha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/818,102

(22) Filed: Aug. 28, 2024

(65) Prior Publication Data

US 2025/0095086 A1      Mar. 20, 2025

(30) Foreign Application Priority Data

Sep. 15, 2023    (KR) ........................ 10-2023-0123249

(51) Int. Cl.
*G06Q 50/06* (2024.01)
*B60L 53/65* (2019.01)
*B60L 53/66* (2019.01)

(52) U.S. Cl.
CPC .............. *G06Q 50/06* (2013.01); *B60L 53/65* (2019.02); *B60L 53/66* (2019.02)

(58) Field of Classification Search
CPC .......... G06Q 50/06; B60L 53/66; B60L 53/65
See application file for complete search history.

(56) References Cited

U.S. PATENT DOCUMENTS

| | | | | |
|---|---|---|---|---|
| 2012/0271758 A1* | 10/2012 | Jammer | ................ | G07F 15/003 |
| | | | | 701/22 |
| 2013/0099892 A1* | 4/2013 | Tucker | ...................... | H04L 9/08 |
| | | | | 340/5.61 |
| 2017/0140349 A1* | 5/2017 | Ricci | ......................... | B60L 53/63 |
| 2018/0281614 A1* | 10/2018 | Hu | ........................... | G06Q 30/06 |
| 2022/0388414 A1* | 12/2022 | Salter | ................... | B60L 53/305 |
| 2023/0229979 A1* | 7/2023 | Kogo | ...................... | B60L 58/12 |
| | | | | 705/5 |
| 2023/0234466 A1* | 7/2023 | Ball | ......................... | B60L 53/65 |
| | | | | 320/108 |
| 2024/0005418 A1* | 1/2024 | Paik | ........................ | G06Q 50/10 |

OTHER PUBLICATIONS

U. Qureshi, A. Ghosh and B. K. Panigrahi, "Dynamic Pricing Based Mobile Charging Service for Electric Vehicle Charging," 2023 IEEE 3rd International Conference on Sustainable Energy and Future Electric Transportation (SEFET), Bhubaneswar, India, 2023, pp. 1-4, doi: 10.1109/SeFeT57834.2023.10245310. (Year: 2023).*

* cited by examiner

*Primary Examiner* — George Chen
*Assistant Examiner* — Tayar M Kyu
(74) *Attorney, Agent, or Firm* — Fox Rothschild LLP

(57) ABSTRACT

The present disclosure relates to a mobile charging service system and method for an electric vehicle. The mobile charging service system according to an embodiment of the present disclosure for providing a mobile charging service whereby, upon request of a service user to a service provider, the service provider charges an electric vehicle of the user, the mobile charging service system includes: a service terminal configured to receive a request for the mobile charging service and receive location information of the electric vehicle; and a charging service vehicle configured to charge a battery of the electric vehicle in response to a shared key being authenticated by the electric vehicle.

12 Claims, 2 Drawing Sheets

SYSTEM AND METHOD FOR MOBILE CHARGING SERVICE FOR ELECTRIC VEHICLE

CROSS REFERENCE TO RELATED APPLICATION

This application claims under 35 U.S.C. § 119 (a) the benefit of Korean Patent Application No. 10-2023-0123249, filed on Sep. 15, 2023, which is hereby incorporated by reference as if fully set forth herein.

BACKGROUND

Technical Field

The present disclosure relates to a mobile charging service system and method for an electric vehicle.

Background

As battery technology advances, the driving range of an electric vehicle per charge is increasing while the amount of time required for a full charge is decreasing.

However, a charging time for an electric vehicle is still longer than a gasoline fueling time.

Although the number of charging stations for electric vehicles in parking lots is increasing, it is still very small, and the overall charging infrastructure remains inadequate. Accordingly, there is a need for a charging service that performs charging at a location where an electric vehicle is parked during a time when the electric vehicle is not in use.

SUMMARY OF THE PRESENT DISCLOSURE

An object of the present disclosure is to provide a system and method for providing a charging service by moving to a location where an electric vehicle of a user is present.

An object of the present disclosure is to assign a restricted permission and support a payment for a charging cost, by a shared key through a server or a smartphone when using a mobile charging service.

To solve the preceding technical problems, according to at least one embodiment of the present disclosure, there is provided a mobile charging service system for providing a mobile charging service in which, upon request of a service user to a service provider, the service provider charges an electric vehicle, the mobile charging service system including: a service terminal configured to receive a request for the mobile charging service and receive location information of the electric vehicle; and a charging service vehicle configured to charge electrically a battery of the electric vehicle in response to a shared key being authenticated by the electric vehicle.

According to at least one embodiment, the service terminal may be configured to transmit a request for the shared key to a user terminal of the service user.

According to at least one embodiment, the service terminal may be configured to receive the shared key from the user terminal.

According to at least one embodiment, the mobile charging service system may further include a user interface configured to execute input and output of information related to the mobile charging service via the user terminal.

According to at least one embodiment, the user interface may be configured to allow requesting parking situation information from the user terminal to the electric vehicle;

and output the parking situation information received from the electric vehicle to the user terminal.

According to at least one embodiment, the parking situation information may include an image or video of the electric vehicle and its surroundings.

According to at least one embodiment, the requesting of the parking situation information may include requesting an image or video from the electric vehicle's drive video recorder or surround view monitor device.

According to at least one embodiment, the user interface may be further configured to allow assigning a usage restriction on using the electric vehicle to the shared key for the electric vehicle based on a parking situation.

According to at least one embodiment, the user interface may be configured to output charging result information and payment information received from the charging service vehicle to the user terminal.

According to at least one embodiment, the mobile charging service system may further include a server configured to receive the request for the mobile charging service and the location information from the user terminal, and transmit the mobile charging service and the location information to the service terminal.

According to at least one embodiment, the server may include: a shared key server configured to receive the request for the mobile charging service and the location information from the user terminal, and request and receive the shared key from the user terminal; and a charging service server configured to receive the location information and the shared key from the shared key server and transmit the location information and the shared key to the service terminal.

According to at least one embodiment, the charging service server may be configured to receive the charging result information from the charging service vehicle and transmit the charging result information and the payment information to the user terminal.

To solve the preceding technical problems, according to at least one embodiment of the present disclosure, there is provided a method of providing a mobile charging service in which, upon request of a service user to a service provider, the service provider charges electrically an electric vehicle of the user, the method including: transmitting, by a user terminal, location information of the electric vehicle in response to a request for the mobile charging service from the service user via a user terminal; and electrically charging, by a charging vehicle, a battery of the electric vehicle when a shared key received from the service user is authenticated by the electric vehicle.

According to at least one embodiment, the method may further include transmitting a request for the shared key from a service terminal to the user terminal.

According to at least one embodiment, the method may further include receiving, by the service terminal, the shared key from the user terminal.

According to at least one embodiment, the method may further include providing, to the user terminal, a user interface for inputting and outputting information related to the mobile charging service.

According to at least one embodiment, the inputting and outputting information related to the mobile charging service may include: requesting parking situation information from the user terminal to the electric vehicle; and outputting the parking situation information received from the electric vehicle to the user terminal.

According to at least one embodiment, the parking situation information may include an image or video of the electric vehicle and its surroundings.

According to at least one embodiment, the requesting for the parking situation information may include requesting images or videos from the electric vehicle's drive video recorder or surround view monitor device.

According to at least one embodiment, the executing of input and output of information related to the mobile charging service may further include: assigning a usage restriction to the shared key for the electric vehicle based on a parking situation; and/or outputting charging result information and payment information received from the charging service vehicle to the user terminal.

According to embodiments of the present disclosure described herein, a charging service may move to and be provided at a location where an electric vehicle of a user is present, contributing to the convenience of charging the electric vehicle.

Further, according to embodiments of the present disclosure described herein, for using a mobile charging service, using a shared key through a server or a smartphone may enable a restricted permission and a payment for a charging cost.

DETAILED DESCRIPTION OF THE DISCLOSURE

Figure 1:
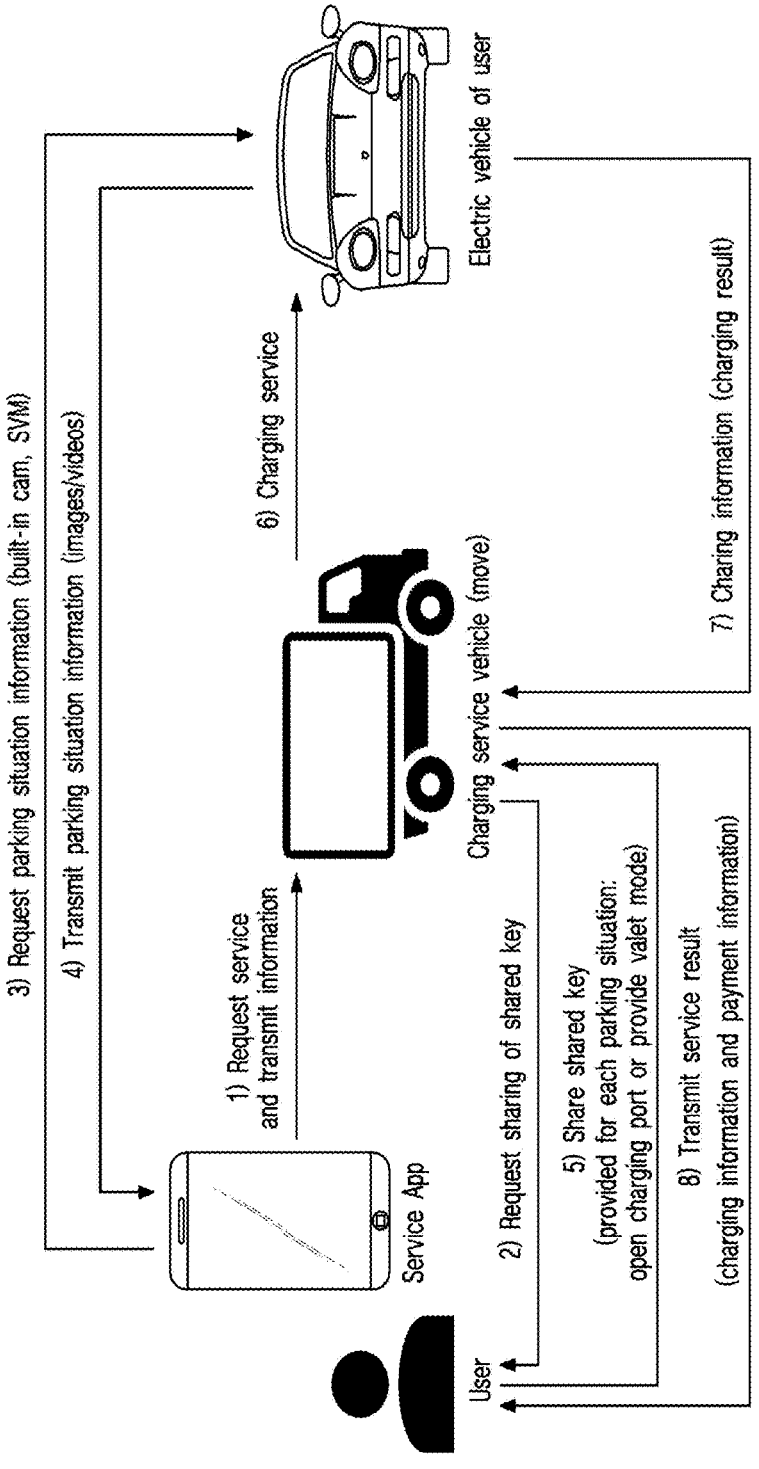
FIG. 1 illustrates a charging service system and a method of providing the same according to an embodiment of the present disclosure.

Hereinafter, embodiments of the present disclosure will be described in detail with reference to the accompanying drawings. The embodiments are not construed as limited to the disclosure and should be understood to include all changes, equivalents, and replacements within the idea and the technical scope of the disclosure.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, a mobile charging service system and a method of providing the same, which provide a mobile charging service in which a service provider charges an electric vehicle of a service user upon request by the user, will be described in detail with reference to the accompanying drawings.

Figure 2:
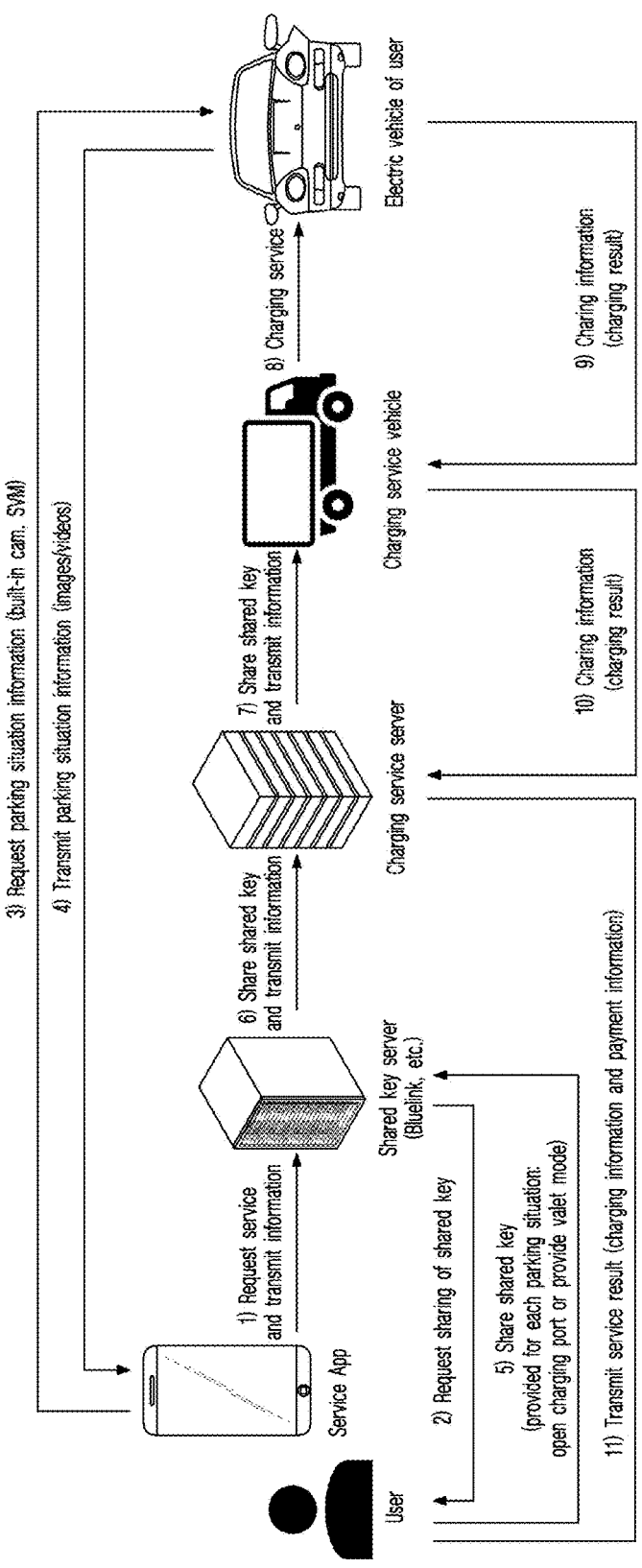
FIG. 2 illustrates a charging service system and a method of providing the same according to another embodiment of the present disclosure.

FIG. 1 illustrates a charging service system and a method of providing the same according to an embodiment of the present disclosure, and FIG. 2 illustrates a charging service system and a method of providing the same according to another embodiment of the present disclosure.

Referring to FIG. 1, a mobile charging service system according to an embodiment may include a service terminal, a charging service vehicle, and a user interface.

The service terminal may be a desktop computer, a tablet computer, a smartphone, or a smartwatch. The service terminal may also be a computer device mounted on the charging service vehicle, such as, for example, an audio video navigation (AVN) device.

The service terminal may be manipulated and operated by a service technician (person).

The charging service vehicle, which may be a mobile mobility capable of charging a battery of an electric vehicle, may include a high-voltage battery for charging, a control device configured to control the charging of the electric vehicle, and a charging gun to be connected to a charging port of the electric vehicle.

The user interface may be a software program for the charging service described herein. The user interface may be provided by a service provider and installed and executed on a user terminal. To this end, a user may access a server set by the service provider to download and install a user interface program onto the user terminal.

Alternatively, the user interface may be executed on a server of the service provider and provided in the form in which the input and output of related information occur on the user terminal. That is, it may be displayed on the screen of the user terminal when the user terminal accesses a site hosted on the service provider's server.

The user interface may include an input/output interface for storing the electric vehicle's number, checking the location of the electric vehicle (e.g., global positioning system (GPS) information), allowing the user to manually input data, requesting the charging service, setting a charging completion time, processing the user's contact information, and other related functions.

The user interface may also be used to request parking situation information from the user terminal to the electric vehicle, and output the parking situation information received from the electric vehicle to the user terminal.

In this case, the parking situation information may include images or videos of the electric vehicle and its surroundings.

In this case, requesting the parking situation information may include, for example, requesting images or videos from a driving image recorder or a surround view monitor of the electric vehicle.

In addition, the user interface may further be used to assign a restricted usage of the electric vehicle to a shared key for each parking situation.

The user interface may also be used to output, onto the user terminal, charging result information and payment information received from the charging service vehicle.

The user terminal may be, as non-limiting examples, a desktop computer, a tablet computer, a smartphone, or a smartwatch. The user terminal may also be a computing device mounted on the electric vehicle, such as, for example, an AVN device.

In this embodiment, the user terminal, the service terminal, the charging service vehicle, and the electric vehicle may each include a communication device.

The communication device may perform wireless mobile communication or wireless Internet communication.

In this case, the mobile communication technology may include at least one of global systems for mobile communications (GSM), code-division multiple access (CDMA), wideband CDMA (WCDMA), high-speed downlink packet access (HSDPA), long-term evolution (LTE), and fifth generation of mobile communications (5G).

The wireless Internet technology may include at least one of wireless local-area network (LAN) (WLAN), wireless fidelity (Wi-Fi), digital living network alliance (DLNA), wireless broadband (WiBro), and worldwide interoperability for microwave access (WiMAX).

The communication device according to the embodiment may also perform short-range communication. In this case, the short-range communication technology may include at least one of Bluetooth, radio frequency identification (RFID), infrared data association (IrDA), ultra-wideband (UWB), ZigBee, near-field communication (NFC), and Wi-Fi direct.

Referring to FIG. 1, the user may first transmit a request for the mobile charging service to the service terminal via the user terminal. In this case, they may transmit the request along with location information about a location where the electric vehicle of the user is parked.

The service terminal may receive the request for the mobile charging service and may transmit a request for sharing of a shared key to the user terminal.

The shared key described herein may be a digital key stored in the user terminal or a card key stored in an NFC card.

The digital key may provide functions such as door locking and unlocking, remote start, emergency alarm, trunk opening, and the like, from a short distance via Bluetooth Low Energy (BLE) remote control, and may be easily shared with others via user terminals (e.g., corresponding applications on smartphones).

The digital key may also be used to open and close doors of the vehicle, only with a user terminal having a UWB function, without touching the user terminal on a door handle, and to start the vehicle only with the user terminal being present inside the vehicle.

The NFC card key may be available after being registered in the vehicle and may be used to unlock doors by tagging the card to the door handle.

The card key may then be placed at a predetermined location in the vehicle to start the vehicle.

Although the user may hand over the card key to a service technician when sharing the shared key, the following describes a case where the digital key is shared.

The user may transmit the shared key to the service terminal via the user terminal. In this case, the user may set a permission for the shared key through the user interface of the user terminal and then transfer it.

For example, the permission for the shared key may be limited to unlocking the doors of the electric vehicle and opening a charging port door or may be limited to a valet mode among control modes of the electric vehicle.

In the valet mode, for example, in-vehicle screen or button operations may not be allowed to protect the privacy of a driver, but when there is an attempt at such operations, vehicle information generated during the operations may be transmitted to the designated user terminal.

To check a parking situation, the user may request parking situation information from the electric vehicle via the user terminal.

In response to the request received from the user terminal, the electric vehicle may transmit images (e.g., photos) or videos of the electric vehicle and its surroundings to the user terminal using a driving video recorder (e.g., a video recording device built in the electric vehicle, which is also referred to as a built-in cam system) or a surround view monitor.

The user may assign a restricted permission for the shared key based on the parking situation information through the user interface displayed on the user terminal, and then transmit the shared key to the service terminal.

After the charging service vehicle arrives at the location of the electric vehicle, the electric vehicle may perform authentication on the shared key and allow the restricted permission for controlling the electric vehicle based on the assigned restricted permission.

In response to the authentication on the shared key being successful, the service technician may open a door of the electric vehicle, operate a charging port door switch to open the charging port door, and start charging the electric vehicle.

The electric vehicle may transmit charging result information to the service terminal during or after the charging.

The service terminal may then transmit the charging result information and payment information about a charging cost to the user terminal.

Hereinafter, another embodiment of the present disclosure will be described with reference to FIG. 2.

Unlike the embodiment described above with reference to FIG. 1, this embodiment includes a shared key server and a charging service server, and the following description will focus on the differences from the embodiment described above with reference to FIG. 1.

First, the user may transmit a request for the mobile charging service and location information of the electric vehicle to the shared key server, using the user terminal.

The shared key server may be any server that provides any service related to the shared key, for example, a Bluelink service server.

The Bluelink service, provided by Hyundai Motor to its connected car service subscribers, may allow the service subscribers to use their smartphones to access services such as starting their vehicles, controlling air-conditioning systems, opening and closing doors, finding a parking spot, and more.

The shared key server may transmit a request for sharing the shared key to the user terminal after receiving the request for the mobile charging service.

In a similar way described above with reference to FIG. 1, the user may request and receive parking situation information from the electric vehicle.

The user may transmit the shared key to the shared key server via the user terminal, and in this case, may transmit the shared key after assigning a restricted permission based on a parking situation, as described above with reference to FIG. 1.

The shared key server may then transmit the received shared key and the location information of the electric vehicle to the charging service server.

The charging service server may then transmit the received shared key and the location information of the electric vehicle to the service terminal.

Subsequently, the charging service vehicle may move to a location where the electric vehicle is located and perform the charging service for the electric vehicle, which is the same as the embodiment of FIG. 1 and will not be repeated here.

After the charging is completed, the service terminal may receive charging result information from the electric vehicle and transmit it to the charging service server.

The charging service server may then calculate a charging cost based on the charging result information and transmit, to the user terminal, payment information along with the charging result information.

What is claimed is:

1. A mobile charging service system for providing a mobile charging service in which, upon request of a service user to a service provider, the service provider charges an electric vehicle, the mobile charging service system comprising:

a service terminal configured to receive a request for the mobile charging service and receive location information of the electric vehicle;

a charging service vehicle configured to electrically charge a battery of the electric vehicle in response to a shared key being authenticated by the electric vehicle; and a user interface configured to execute input and output of information related to the mobile charging service via a user terminal of the service user, wherein the shared key is programmed to delegate control rights of the electric vehicle to the charging service vehicle, wherein upon the shared key being provided to the charging service vehicle, the charging service vehicle performs one or more operations on the electric vehicle, and wherein the user interface is configured to:

allow requesting parking situation information from the user terminal to the electric vehicle; and output the parking situation information received from the electric vehicle to the user terminal, wherein the parking situation information comprises at least one of an image or a video of the electric vehicle and its surroundings captured by a driving recorder or a surround view monitor (SVM) of the electric vehicle, and wherein requesting the parking situation information comprises requesting the at least one of the image or the video of the electric vehicle and its surroundings.

2. The mobile charging service system of claim 1, wherein the user interface is further configured to:

allow assigning a usage restriction to the shared key for the electric vehicle based on a parking situation.

3. The mobile charging service system of claim 1, wherein the user interface is further configured to:

output charging result information and payment information received from the charging service vehicle to the user terminal.

4. The mobile charging service system of claim 1, wherein the service terminal is configured to:

transmit a request for the shared key to a user terminal of the service user.

5. The mobile charging service system of claim 4, wherein the service terminal is further configured to:

receive the shared key from the user terminal.

6. The mobile charging service system of claim 1, further comprising:

a server configured to receive the request for the mobile charging service and the location information from a user terminal of the service user, and transmit the mobile charging service and the location information to the service terminal.

7. The mobile charging service system of claim 6, wherein the server comprises:

a shared key server configured to receive the request for the mobile charging service and the location information from the user terminal, and request and receive the shared key from the user terminal; and a charging service server configured to receive the location information and the shared key from the shared key server and transmit the location information and the shared key to the service terminal.

8. The mobile charging service system of claim 7, wherein the charging service server is further configured to:

receive charging result information from the charging service vehicle and transmit the charging result information and payment information to the user terminal.

9. A method of providing a mobile charging service in which, upon request of a service user to a service provider, the service provider charges an electric vehicle of the user, the method comprising:

transmitting location information of the electric vehicle in response to a request for the mobile charging service from the service user via a user terminal;

electrically charging, by a charging service vehicle, a battery of the electric vehicle when a shared key received from the service user is authenticated by the electric vehicle; and providing, to the user terminal, a user interface for inputting and outputting information related to the mobile charging service, wherein the shared key is programmed to delegate control rights of the electric vehicle to the charging service vehicle, wherein upon the shared key being provided to the charging service vehicle, the charging service vehicle performs one or more operations on the electric vehicle, and wherein inputting and outputting of the information related to the mobile charging service comprises:

requesting parking situation information from the user terminal to the electric vehicle; and outputting the parking situation information received from the electric vehicle to the user terminal, wherein the parking situation information comprises at least one of an image or a video of the electric vehicle and its surroundings captured by a driving recorder or a surround view monitor (SVM) of the electric vehicle, and wherein requesting the parking situation information comprises requesting the at least one of the image or the video of the electric vehicle and its surroundings.

10. The method of claim 9, wherein the executing of input and output of information related to the mobile charging service comprises:

assigning a usage restriction to the shared key for the electric vehicle based on a parking situation; and/or outputting charging result information and payment information received from the charging service vehicle to the user terminal.

11. The method of claim 9, further comprising:

transmitting a request for the shared key from a service terminal to the user terminal.

12. The method of claim 11, further comprising:

receiving, by the service terminal, the shared key from the user terminal.

* * * * *